US006904173B2

(12) United States Patent
Bagni et al.

(10) Patent No.: US 6,904,173 B2
(45) Date of Patent: Jun. 7, 2005

(54) PROCESSING OF MOTION VECTOR HISTOGRAMS FOR RECOGNIZING THE INTERLEAVED OR PROGRESSIVE CHARACTER OF PICTURES

(75) Inventors: Daniele Bagni, Olgiate Molgora (IT); Luca Battistelli, San Donà di Piave (IT)

(73) Assignee: STMicroelectronics S.r.l., Agrate Brianza (IL)

( * ) Notice: Subject to any disclaimer, the term of this patent is extended or adjusted under 35 U.S.C. 154(b) by 764 days.

(21) Appl. No.: 09/728,506

(22) Filed: Dec. 1, 2000

(65) Prior Publication Data

US 2001/0002921 A1 Jun. 7, 2001

(30) Foreign Application Priority Data

Dec. 2, 1999 (EP) .............................................. 99830751

(51) Int. Cl.$^7$ .............................. G06K 9/36; H04N 7/12
(52) U.S. Cl. .................................... 382/236; 375/240.16
(58) Field of Search ................................ 382/232, 235, 382/236, 303, 304, 305, 307; 375/240.12, 240.13, 240.15, 240.16

(56) References Cited

U.S. PATENT DOCUMENTS

| 5,461,420 | A | * | 10/1995 | Yonemitsu et al. | .... | 375/240.15 |
| 5,878,166 | A | | 3/1999 | Legall | ........................ | 382/232 |
| 5,929,915 | A | * | 7/1999 | Cho | ........................ | 375/240.13 |
| 6,115,070 | A | * | 9/2000 | Song et al. | ............ | 375/240.12 |
| 6,501,799 | B1 | * | 12/2002 | Kohn | .................... | 375/240.16 |
| 2003/0161404 | A1 | * | 8/2003 | Wu | ........................ | 375/240.16 |

FOREIGN PATENT DOCUMENTS

EP 0573665 12/1993 .......... H04N/7/137

OTHER PUBLICATIONS

Yanbin Yu et al. "Interlaced Video Coding with Field–Based Multiresolution Representation" Signal Processing Image Communication, NL, Elsevier Science Publishers, Amsterdam, vol. 5, No. 1/02 (Feb. 1, 1993), pp. 185–198 XP000345620 ISSN: 0923–5965.

Wei et al. "Video Coding for HDTV Systems" Proceedings of the Annual International Computer Software and Applications Conference (Compsac), US, Los Alamitos, IEEE Comp. Soc. Press, vol. CONF. 18, 1994, pp. 469–475, XP000531343 ISBD: 0–8186–6707–9.

\* cited by examiner

Primary Examiner—Mehrdad Dastouri
(74) Attorney, Agent, or Firm—Lisa K. Jorgenson; Allen, Dyer, Doppelt, Milbrath & Gilchrist, P.A.

(57) ABSTRACT

A method of processing a bitstream of coded data of video sequences of progressive or interlaced pictures includes estimating motion vectors of groups of pixels. These groups of pixels belong to a top half-frame of the current picture in relation to pixels belonging to a bottom half-frame of a preceding picture. Motion vectors are also estimated for group of pixels of a bottom half-frame of the current picture in relation to pixels belonging to the top half-frame of the current picture. The processing calculates for each macroblock of a top half-frame and a bottom half-frame a respective top motion coefficient and a bottom motion coefficient depending on the estimation of the motion vectors of the top half-frame and the bottom half-frame. The current picture is recognized as an interlaced picture by a substantial equality of the distributions of values of the motion coefficients, or as a progressive picture by a substantial inequality of the distributions of values of the motion coefficients.

28 Claims, 6 Drawing Sheets

PROCESSING OF MOTION VECTOR HISTOGRAMS FOR RECOGNIZING THE INTERLEAVED OR PROGRESSIVE CHARACTER OF PICTURES

FIELD OF THE INVENTION

The present invention relates to methods for processing digital video pictures, and, more particularly, to a method for detecting properties of a sequence of digital pictures.

BACKGROUND OF THE INVENTION

The increasing requirements of television sets in terms of quality of the displayed images, and the increasing requirements of transmitting devices in terms of amplitude of the frequency bands used during transmission have made the techniques for transmitting video sequences very important. Use of digital transceiving systems has made possible splitting of a frame of a picture into a matrix of numerical values representing the intensities of the video components of each pixel of a frame. This allows processing of the picture by computers. The possibility of treating a picture as a matrix of numbers, and as a bitstream, offers the possibility of coding pictures to facilitate transmission and to improve the quality of displayed images.

Systems for coding video digital sequences are based on the recognition of several properties of pictures. Among such properties, a particular importance is the detection of the character progressive or interlaced of the pictures, and the detection of the motion of the objects. When these properties are known, it is possible to compress the picture making most efficient their transmission in terms of used frequency band, and most satisfactory in terms of their display quality.

Several techniques of motion estimation and detection of the progressive or interlaced content, i.e., interlaced progressive detection (IPD) of digital video sequences are known. Such techniques are disclosed in U.S. Pat. No. 5,734,420, and patents WO 99/20040, EP-A-0917363, EP-A-0944245, EP-A-0979011, EP99830545.2, and EP98830689.0. These patents are incorporated herein by reference in their entirety, and are assigned to the assignee of the present invention. The methods disclosed in the above mentioned documents operate on the bit values representing the video components of single pixels. This requires a computational complexity that makes them inappropriate for low cost applications.

A frame according to the PAL standard is composed of 720*288=207,360 pixels. Methods operating on each pixel are rather burdensome or impose simplifications that reduce the quality of the displayed picture. Methods of elaborating a bitstream of video digital sequences operating on groups of pixels (macroblocks) to reduce the computation complexity are generally used for low cost applications.

More precisely, there is a need for a method of elaborating data of digital video sequences that provides the following advantages while operating on groups of pixels. These advantages permit recognition of the processed picture as a progressive or interlaced picture with a reduced number of calculations. There should be a reduction in the amount of calculated motion estimations while preserving quality and efficiency of the compression. The quality of displayed pictures are enhanced for the same compression efficiency and the same amount of calculations performed during the motion estimation.

SUMMARY OF THE INVENTION

In view of the foregoing background, it is therefore an object of the present application to provide a processing method usable with MPEG standard coded video sequences requiring the performance of calculations only on motion vectors. Given that motion vectors can be defined even for a macroblock, instead of being defined for each single pixel, an advantageous computational simplification may be achieved.

The method according to the present invention allows the detection of the progressive or interlaced content of a picture for improving the effectiveness of the coding of video sequences, and the effectiveness of the filtering that is made on the chrominance component of pictures input to the coder. The method allows for an enhanced precision in the calculation of motion vectors by virtue of a pre-recognition of the processed picture as a progressive or interlaced picture.

Another object of the present invention is to provide a method of processing a bitstream of coded data of video sequences of progressive or interlaced pictures, divisible in a top half-frame and in a bottom half-frame, that comprises estimating motion vectors of groups of pixels belonging to the top half-frame of the current picture in relation to pixels belonging to the bottom half-frame of the preceding picture, and estimating motion vectors of groups of pixels of the bottom half-frame of the current picture in relation pixels belonging to the top half-frame of the current picture.

Starting from such estimations, respective top and bottom motion coefficients depending on the estimation of the motion vectors of the top and bottom half-frame are calculated for each macroblock of the top half-frame and bottom half-frame. The current picture is recognized as a progressive or an interlaced picture as a function of the calculated top and bottom motion coefficients. A substantial equality of the distributions of values of motion coefficients point to an interlaced content by contrast, and a substantial inequality of the distribution of values of the coefficients point to a progressive content.

The recognition can be done by calculating a pair of shape coefficients representing the distributions of the top and bottom motion coefficients. The current picture is recognized as progressive or as interlaced depending on whether the shape coefficients differ by a quantity greater or lower than a certain value.

According to an alternative embodiment, it is possible to distinguish progressive pictures from interlaced pictures by calculating a coefficient representing the stochastic correlation between the distribution of the top and bottom motion coefficients. In addition, the current picture can be recognized as an interlaced picture or as a progressive picture depending on whether the calculated coefficient exceeds a certain value.

The recognition is preferably established by comparing the top and bottom coefficients with a pre-established top threshold and a bottom threshold, respectively. The number of motion vectors whose motion coefficients are lower than the top threshold of the top and the bottom frame of the current picture are counted. This produces a pair of respective coefficients. The number of motion vectors whose motion coefficients are greater than the bottom threshold of the top and bottom half-frame of the current picture are counted. This produces a second pair of respective coefficients. The current picture is recognized as a progressive or interlaced picture depending on the four coefficients relative to the current picture and to preceding pictures.

The method according to the present invention may also comprise the following steps. For each picture, a temporary weight value is calculated as a function of the result of the recognition of the picture as a progressive or interlaced picture carried out according to the above mentioned method. A final weight value is calculated as a function of the temporary weight value relative to the picture and of the final weight values relative to preceding pictures. A current picture is recognized as a progressive or an interlaced picture depending on its temporary weight value and on the final weight values relative to preceding pictures.

These methods may be implemented to obtain a refined calculation of the motion vectors of a picture of a video sequence by a Frame-Prediction technique if the current picture is recognized as a progressive picture, or by a Field-Prediction technique if the current picture is recognized as an interlaced picture.

BRIEF DESCRIPTION OF THE DRAWINGS

The different aspects and advantages of the present invention will result even more evident through the description of several embodiments of the invention and by referring to the attached drawings, wherein:

FIG. 6b is a detailed flowchart of the functional block Hysteresis illustrated in FIG. 6a;

FIG. 6c is a flowchart of the functional block Quasi-stationary illustrated in FIG. 6a;

DETAILED DESCRIPTION OF THE PREFERRED EMBODIMENTS

The method according to the present invention allows the recognition of pictures of digital video sequences as interlaced or progressive pictures irrespectively of the standards used for coding. The method exclusively depends on previously performed estimations of motion vectors relative to groups of pixels. The method can be exploited to improve the calculation of motion vectors in terms of augmented precision and/or in terms of reduced computational complexity.

The fundamental approach of the present invention comprises always carrying out motion estimation through a comparison of parameters of consecutive half-frames to verify whether the pictures to code are interlaced or progressive. A frame of a picture is divisible in two half-frames (fields), commonly called top (or odd) field and bottom (or even) field. This is because of the position of the lines forming the frame.

In case of a progressive sequence, if the motion estimation is carried out on the bottom field with reference to the top field belonging to the same frame, the modulus of the resulting motion vectors will tend to zero. This happens because the two fields have been sampled by a progressive camera at the same time instant (in fact they belong to the same frame), and not at an interval of $\frac{1}{50}$ (or of $\frac{1}{60}$) of a second, as in the case of an interlaced PAL or NTSC camera.

Moreover, is very probable that the vertical component of motion vectors be between −1 and 1. This is because of the vertical difference of a line between fields of different parity, while the horizontal component is practically zero. It is always possible that zones with an elevated vertical detail (spatial frequencies) deceive the estimator by having it estimating a non-existent vertical motion. However, it is supposed to have a robust motion estimator not affected by this problem.

In contrast, motion estimation between the top field of frame k and the previous bottom field of the frame k−1 will detect an effective motion, not only in an interlaced sequence, but also in an eventual progressive sequence. The two fields are sampled at different instants, and in fact they belong to different frames.

Figure 1:
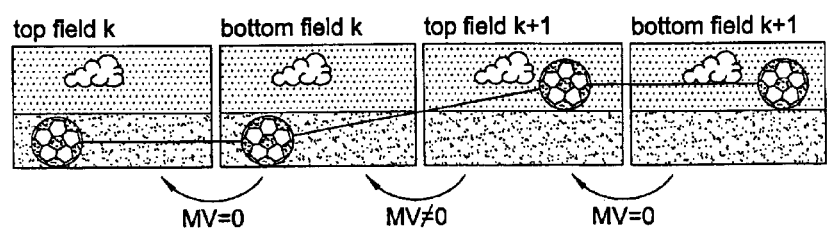
FIG. 1 is an example of a video sequence taken with a progressive camera according to the prior art.
Figure 2:
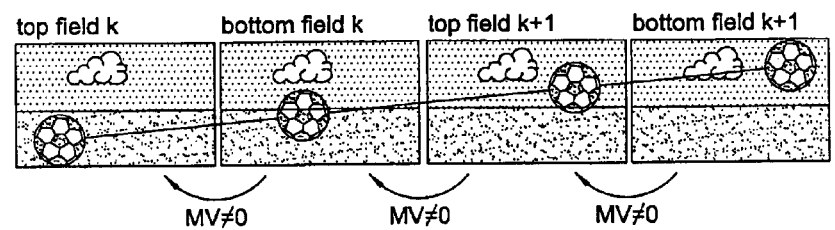
FIG. 2 is an example of a video sequence taken with an interlaced camera according to the prior art.

FIGS. 1 and 2 illustrate this concept. In particular, FIG. 1 shows the motion of a ball taken by a progressive camera, and FIG. 2 shows the same scene taken by an interlaced camera. As can be seen, while from a field to the successive of the sequence of FIG. 2, the motion vectors MV are always different from zero. This is not true for the motion vectors of the sequence of FIG. 1. In fact, the motion vectors MV from a bottom field to a top field of the same frame k or k+1 are always zero, while the motion vectors MV from a top field belonging to the frame k+1 to the bottom field belonging to the frame k are always different from zero. The critera of the invention for distinguishing in a relatively straightforward manner interlaced pictures from progressive pictures is based on such a peculiarity.

The variable $\text{MV}_{\text{TOP}_{X,Y}}(\kappa)$ is indicated as the motion vectors of the k-th top half-frame with respect to the (k−1)-th bottom half-frame, and $\text{MV}_{\text{BOT}_{X,Y}}(\kappa)$ is indicated as the motion vectors of the k-th bottom half-frame with respect to the k-th top half-frame, where k is the frame number. Such motion vectors $MV = (V_x, V_y)$ may be relative to single pixels or to groups of pixels (macroblocks) of the k-th picture, belonging to the top half-frame or the bottom half-frame, respectively.

To implement the method according to the present invention, it is necessary to obtain by estimating, even coarsely, the motion vectors $\text{MV}_{\text{TOP}_{X,Y}}(\kappa)$ and $\text{MV}_{\text{BOT}_{X,Y}}(\kappa)$, as many respective motion coefficients $V_{\text{TOP}_{X,Y}}(\kappa)$ and $V_{\text{BOT}_{X,Y}}(\kappa)$, and to recognize the current picture as a progressive or interlaced picture depending on such coefficients.

A preferred way of calculating the motion coefficients $V_{\text{TOP}_{X,Y}}(\kappa)$ and $V_{\text{BOT}_{X,Y}}(\kappa)$ is to calculate for each motion vector MV the sum of the absolute value of its components, i.e., to make $$V_{\text{TOP}_{X,Y}}(\kappa) = |V_x| + |V_y|$$

This is done by considering the motion vectors $MV\text{TOP}_{X,Y}(\kappa)$ of the top half-frame of the k-th picture, and to make $$V\text{BOT}_{X,Y}(\kappa)=|V_x|+|V_y|$$

This is done by considering the motion vectors $MV\text{BOT}_{X,Y}(\kappa)$ of the bottom half-frame of the k-th picture. The above way of calculating the motion coefficients is only one of several possible ones. For example, it would be satisfactory to calculate the motion coefficients as the square root of the sum of squares of $V_x$ and $V_y$, as well as in other ways, as will appear evident to one skilled in the art.

By way of an example, the case where the motion coefficients $V\text{TOP}_{X,Y}(\kappa)$ and $V\text{BOT}_{X,Y}(\kappa)$ are calculated as the sum of the absolute values of the components of the motion vector MV will be described below. The method may also be implemented by calculating motion coefficients in a different manner.

It is possible to distinguish an interlaced picture from a progressive picture by examining the distribution of the motion coefficients of its top half-frame and of its bottom half-frame. It has been found that progressive pictures are characterized by notable differences in the distribution of top and bottom coefficients, while interlaced pictures are characterized by distinctly more uniform distributions of motion coefficients.

This concept is clearly shown in FIGS. 3a–3b and 4a–4b wherein two typical histograms of the respective distributions of motion coefficients of a top half-frame (top field) and of a bottom half-frame (bottom field), relative to progressive sequences and interlaced sequences, respectively, are depicted.

Figure 3A:
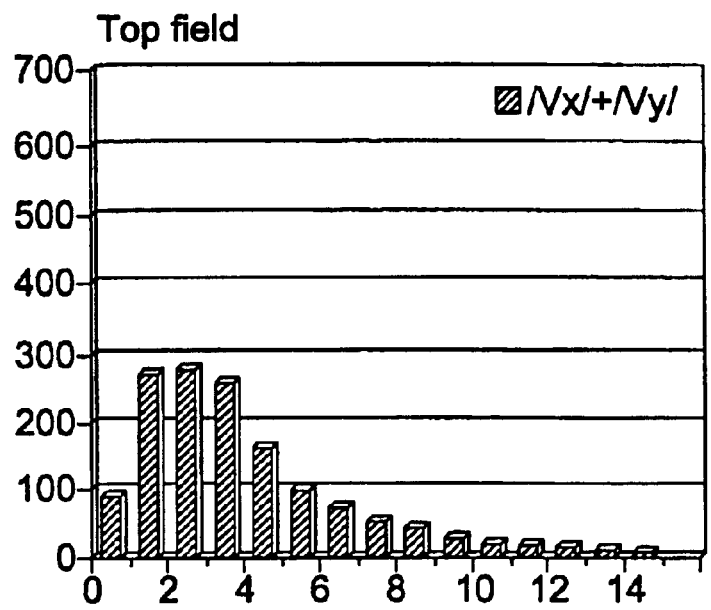
FIGS. 3a–3b are examples of a possible distribution of the motion coefficients of the motion vectors of a top half-frame (top field) and of a bottom half-frame (bottom field) of a progressive sequence according to the prior art.
Figure 3B:
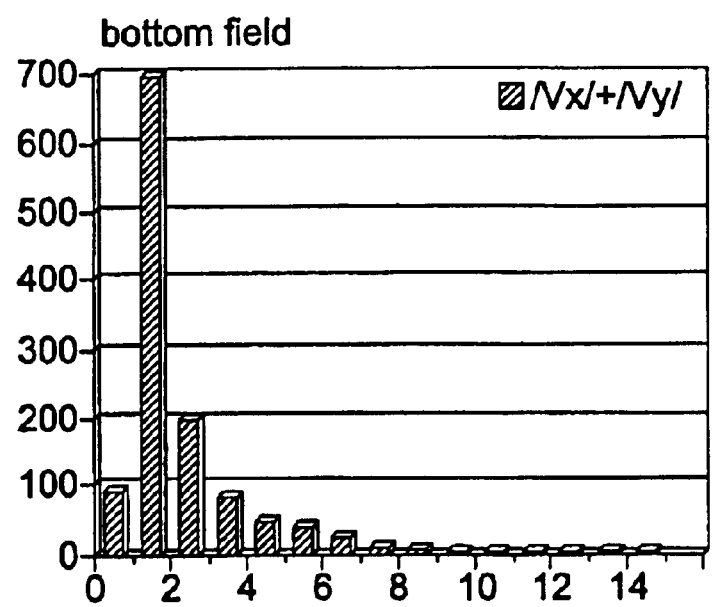
Figure 4A:
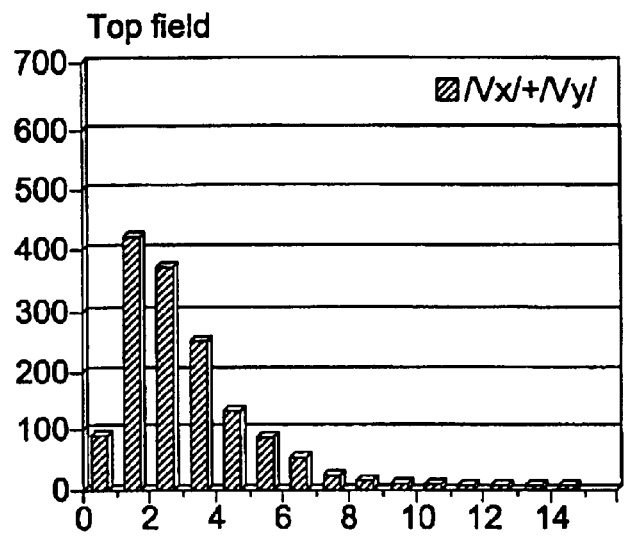
FIGS. 4a–4b are example of a possible distribution of the motion coefficients of motion vectors of a top half-frame (top field) and of a bottom half-frame (bottom field) of an interlaced sequence according to the prior art.
Figure 4B:
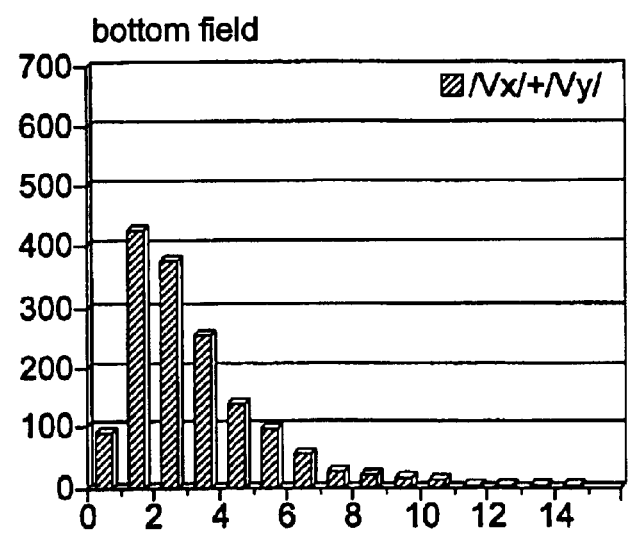

In particular, in FIGS. 3a–3b the difference between the two distributions is evident. The distribution of coefficients of the bottom field is characterized by a greater concentration (vertical axis) near the value 1 (horizontal axis), while the distribution of coefficients of the top field has a greater uniformity. On the contrary in FIGS. 4a–4b, the two histograms are almost identical.

Upon testing many different video sequences, calculating the respective distributions of motion coefficients, obtained with different motion estimators, it has been seen that the distributions of motion coefficients of bottom fields belonging to frames of movie sub-sequences (film-mode) show a distinct concentration about the maximum value, which is near to 1. This is because of the vertical component of vectors. On the contrary in top fields such a maximum is distinctly lower, i.e., the dispersion is higher than in bottom fields. Also, the distributions of motion coefficients of top fields and of bottom fields belonging to interlaced sequences have a substantially similar shape, and the dispersion of the distributions is greater the more motion is present.

The same significant shapes are obtained even for a single frame in addition to whole sequence. An interlaced picture is characterized in that the distribution of top motion coefficients is almost identical to that of bottom motion coefficients. This is while a progressive picture is characterized by a notable difference between distributions of top and bottom motion coefficients, and by a relatively stronger clustering near the maximum value of the bottom motion coefficients than of the top motion coefficients.

The detection of one of the above mentioned characteristics is exploited for recognizing the progressive or the interlaced content of a picture. The stochastic variable theories give several methods for recognizing one of the above mentioned properties. Such methods may include calculating a pair of shape coefficients representing the distribution of the top and of the bottom motion coefficients, and in verifying whether between the two shape coefficients there is a substantial difference or not. In the positive case, the two distributions are recognized as similar, otherwise as different from each other.

Alternatively it is possible to calculate a coefficient representative of the correlation of the two distributions, and to verify whether such a correlation coefficient exceeds a certain value. In the positive case the picture is interlaced, otherwise the picture is progressive.

Yet another method may include using as a shape coefficient the variance with respect to the maximum value of the two distributions of motion coefficients. Given that for a progressive picture the values of motion coefficients of the bottom field are more clustered near their maximum than the values of motion coefficients of a top field, the variance for the top field will be greater than the variance for the bottom field. Therefore, if the variance of the motion coefficients of the top field exceeds by a certain percentage the variance of the motion coefficients of the bottom field, the picture is progressive, otherwise the picture is interlaced.

A particularly interesting application of the invention for performing a pre-test of the type of pictures includes recognizing a picture as progressive by way of the motion coefficients. Sometimes in video sequences there are pictures called quasi-stationary, whose motion is limited to relatively small portions of the frame. A typical quasi-stationary picture is a picture representing a TV news speaker, wherein the motion is substantially limited to the face of the speaker while the remaining portion of the picture remains substantially static.

In such a situation there is a relatively small difference between a progressive and an interlaced picture. Therefore, without introducing relevant errors it is possible to classify the examined picture as a matter of convenience. Because a most important application is for video sequences to be coded according to the MPEG standard, the quasi-stationary pictures may be considered progressive because such a choice allows a considerable reduction in the number of calculations needed for the MPEG coding.

The recognition of pictures as quasi-stationary pictures is carried out by producing two sum coefficients, respectively top $SV\text{TOP}$ and bottom $SV\text{BOT}$, as the sum of all top and bottom motion coefficients, respectively. This is represented by the signal B of the quasi-stationary block of the schemes of FIGS. 6a and 6c. If both sum coefficients $SV\text{TOP}$ and $SV\text{BOT}$ are lower than respective pre-established positive numbers T1 and T2, that is:

$$SV\text{TOP}<T1 \text{ and } SV\text{BOT}<T2 \quad (1)$$

then the examined picture will be recognized as a quasi-stationary picture.

Given the great simplification resulting from the possibility of treating pictures as quasi-stationary pictures, it is possible to conveniently use the above described test before any subsequent test for detecting eventually the progressive or interlaced content of a picture. A preferred way of discriminating progressive pictures from interlaced pictures includes defining two pre-established thresholds, respectively bottom THR1 and top THR2, and comparing the top motion coefficients $V\text{TOP}_{X,Y}(\kappa)$ and bottom motion coefficients $V\text{BOT}_{X,Y}(\kappa)$ with these thresholds, indicating with the following:

$N1\text{TOP}(\kappa)$=number of all $MV\text{TOP}_{X,Y}(\kappa)$ such that $V\text{TOP}_{X,Y}(\kappa)<THR1$ $N2\text{TOP}(\kappa)$=number of all $MV\text{TOP}_{X,Y}(\kappa)$ such that $V\text{TOP}_{X,Y}(\kappa)>THR2$ (2)

Figure 5:
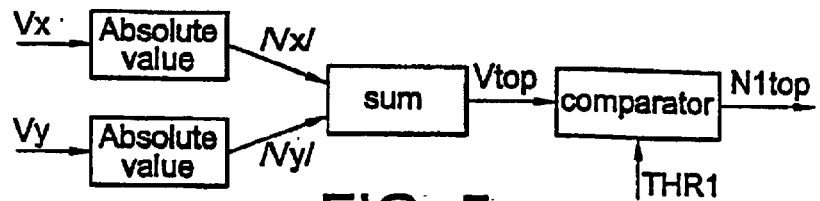
FIG. 5 is a block diagram of a circuit for executing an algorithm that calculates comparison coefficients according to the prior art.

$N1\text{BOT}(\kappa)$=number of all $MV\text{BOT}_{X,Y}(\kappa)$ such that $V\text{BOT}_{X,Y}(\kappa)<THR1$ $N2\text{BOT}(\kappa)$=number of all $MV\text{BOT}_{X,Y}(\kappa)$ such that $V\text{BOT}_{X,Y}(\kappa)>THR2$ An example of a possible functional block diagram for calculating the parameter $N1\text{TOP}(\kappa)$ of a top field is shown in FIG. 5. The architecture for calculating the other three parameters is the same.

Referring to the histograms of FIGS. 3a–3b and 4a–4b, N1TOP(κ) and N1BOT(κ) give an indication of the maximum value of the distributions (if THR1 is greater than such a maximum value), while N2TOP(κ) and N2BOT(κ) indicate their dispersion (width of the dome-shaped curve enveloping the histograms).

The following ratios are defined:

$$R1\ (\kappa) = N1\text{TOP}(\kappa)/N1\text{BOT}(\kappa-1)$$

$$R2\ (\kappa) = N1\text{BOT}(\kappa)/N1\text{TOP}(\kappa) \qquad (3)$$

$$R3\ (\kappa) = N2\text{TOP}(\kappa)/N2\text{BOT}(\kappa-1)$$

$$R4\ (\kappa) = N2\text{BOT}(\kappa)/N2\text{TOP}(\kappa)$$

Calling γ, δ, ε and η four pre-established numbers, if all the following tests verify:

$$R1(\kappa) < \gamma$$

$$R2(\kappa) > \delta \qquad (4)$$

$$R3(\kappa) > \epsilon$$

$$R4(\kappa) < \eta$$

then the k-th frame is recognized as progressive, otherwise it is recognized as interlaced. The choice of using all four parameters instead of using only R2 (κ) and R4 (κ), for example, is due to the fact that because a decision must be taken for each frame, it is preferable to use all available information to minimize uncertainty.

To prevent errors, it is also possible to apply the following conditions:

$$R5(\kappa) = R2(\kappa)/R1(\kappa) > \theta \qquad (5)$$

$$R6(\kappa) = R3(\kappa)/R4(\kappa) > \iota$$

The variables θ and L are two pre-established positive numbers. The latter conditions impose a more distinguishable difference between the two distributions for classifying a picture as a progressive one.

An advantage of the above described procedures includes the possibility of operating on motion vectors established for macroblocks rather than exclusively for single pixels. This permits an evident simplification of calculations that makes the method of the invention particularly appropriate even in low cost applications.

To avoid oscillations in the results provided by the procedure of the invention for detecting the interlaced or progressive content of the picture, a simple hysteresis mechanism that considers the decisions taken in preceding frames may be introduced. The oscillations could be caused by short portions of a video sequence wherein the motion is such to make the discrimination very difficult.

A hysteresis mechanism may be realized by associating to each picture a temporary weight value P(κ) depending on the recognition of the picture as a progressive or an interlaced picture, according to one of the above described methods of the invention. For each processed picture a final weight value D(κ) is calculated as a function of its temporary weight value P(κ), and of the final weight values D(I) relative to one or more preceding pictures. The current picture is recognized as a progressive or interlaced picture based on its final weight value.

Figure 6A:
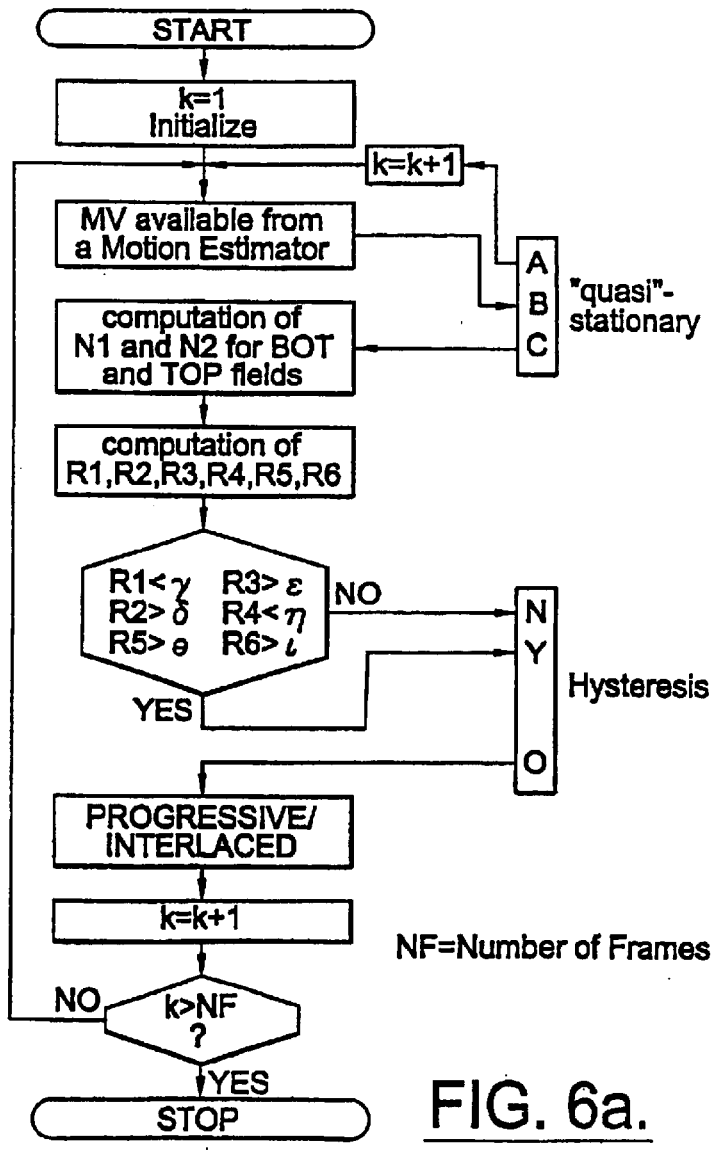
FIG. 6a is a flowchart of the interlaced progressive detection (IPD) procedure according to the present invention.

An example of how such a hysteresis algorithm may be realized is shown in the flowchart of FIG. 6a. First, the number of previous pictures to be considered must be decided by attributing a value to the parameter NF, for example NF=3. Afterwards, the system applies an arbitrary technique for estimating the motion vectors and calculates the motion coefficients $V\text{TOP}_{X,Y}(\kappa)$ and $V\text{BOT}_{X,Y}(\kappa)$. Starting from the values of these coefficients, the block QUASI-STATIONARY verifies whether the picture is quasi-stationary or not, according to the above described algorithm.

In the positive case, the picture is classified as progressive, its final weight is established D(κ)=ω and a successive picture is processed. In the negative case, the system calculates the ratios R1(κ), R2(κ), R3(κ), R4(κ), R5(κ) and R6(κ) according to equations (3) and (5). If these ratios satisfy the inequalities (4) and (5), the block HYSTERESIS, described in more in detail in FIG. 6c associates a temporary weight P(κ) to the picture. Such a temporary weight is equal to a number β if the inequalities (4) and (5) are satisfied, otherwise the temporary weight is equal to α.

When the temporary weight is known, the block HYSTERESIS recognizes the current frame as a progressive frame if the sum of weights associated to the last two frames and to the current frame is greater than or equal to a certain number m, i.e.:

$$P(\kappa) + D(\kappa-1) + D(\kappa-2) \geq \mu$$

and the frame gets a final weight D(κ)=β. In the contrary case, the current frame gets a final weight D(κ)=ω, and is classified as interlaced.

Figure 6B:
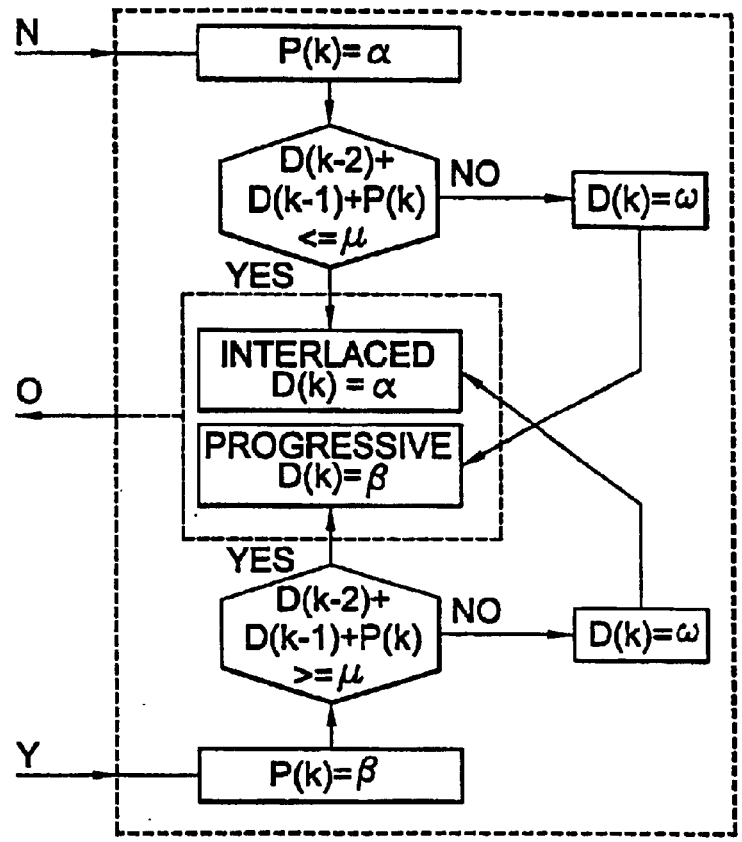
Figure 6C:
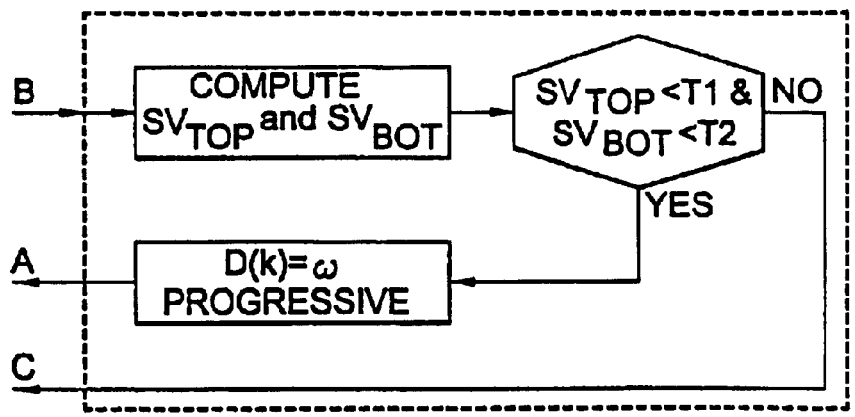

If equations (4) and (5) are not verified (input N of the Hysteresis block in FIGS. 6a and 6b), the current frame k is temporarily classified as interlaced and assumes the temporary weight P(κ)=α. If the complementary condition is verified:

$$P(\kappa) + D(\kappa-1) + D(\kappa-2) \leq \mu$$

The final choice is an interlaced frame with a final weight D(κ)=α. In the contrary case, the frame is classified as progressive and assumes the final weight D(κ)=ω. According to a preferred embodiment of the invention, the weight α, β, μ and ω are equal to 0, 1, 1.5, 0.5, but these values may be changed depending on the needs, even during the same picture sequence.

With such a hysteresis procedure, the effective choice made in previous frames using the weights D(κ−1) and D(κ−2), and the indication given by the various decision parameters R1(κ), R2(κ), R3(κ), R4(κ) are considered, without giving a priority to any one of the two possible choices.

Figure 7:
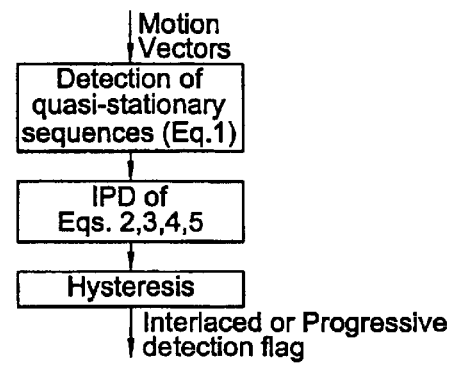
FIG. 7 is the scheme of detection of the progressive or interlaced content of pictures according to the present invention.

A block diagram of an embodiment of the method of the invention is depicted in FIG. 7. Starting from an estimation of the motion vectors, it is verified if the current picture is quasi-stationary. Then the algorithm of the invention (IPD) is executed, and finally a functional block implementing the hysteresis procedure produces a flag indicating whether the picture is progressive or interlaced.

Using the hysteresis procedure, an abrupt change from the interlaced to the progressive scanning mode is prevented, thus avoiding short lasting disturbances (noise) that may affect the decision. The method of the invention allows for the calculation of the motion vectors in a refined manner, by adaptively choosing the calculation algorithm that implies the lowest number of calculations.

Given the importance assumed by the MPEG2 standard in treating sequences of digital pictures, in the following text reference will be made to a MPEG2 system, although the same considerations will be similarly applicable, even in systems based on different standards.

In the MPEG2 standard, as in other standards, at least two different techniques of motion estimation and consequent temporal prediction are possible. One technique is Frame Prediction, wherein the current picture is divided in macroblocks of frames (16×16 pixels), and for each of them the predictor in the preceding frame is found with an arbitrary method for motion estimation.

Another technique is Field Prediction, wherein each macroblock frame is divided in its two component fields (16×8 pixels). One on the even half-frame and one on the odd half-frame, and for each of them the predictor on the field of the same parity belonging to the temporarily preceding picture is found.

The best coding is obtained by testing all possible combinations of predictors of a macroblock. These include frame, field top k on field top k−1, field top k on field bottom k−1, field bottom k on field top k−1, field bottom k on field bottom k−1. In all cases, the prediction (and the motion estimation) can be Forward or Backward. Therefore, a great number of matching errors need to be calculated for each macroblock.

This becomes burdensome for low cost applications. Interlaced sequences with little motion may be coded as progressive, without any relevant loss of quality, thus avoiding a burdening Field Prediction. Similarly, an interlaced sequence with considerable motion would not have any advantage of being predicted as a Frame, and they could satisfactorily require only a Field Prediction estimation.

It is evident that a large computational simplification (from about 30% to about 50%) is obtainable by carrying out only a Field or a Frame estimation. It would be necessary just to have a mechanism for telling the motion estimator when to operate in Field mode and in the Frame mode. This is provided by the IPD algorithm of the present invention. The only requirement is that the motion estimation be carried out on consecutive fields in one or more steps.

Figure 8:
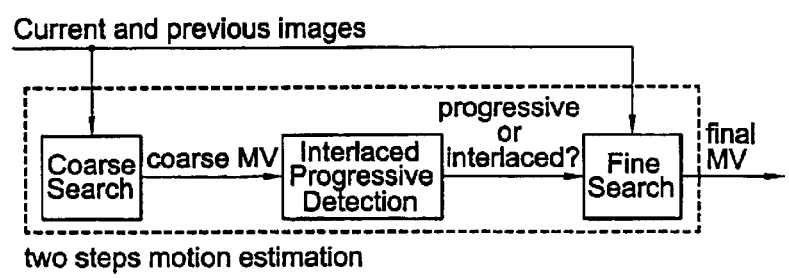
FIG. 8 is a block diagram of a generic two step motion estimator using the IPD prcedure according to the present invention.

The first step, carried out by the block COARSE_SEARCH depicted in FIG. 8, is necessary to calculate coarse estimations of motion vectors from successive frames. The second step, carried out by the block FINE_SEARCH, is necessary to calculate a finer estimation of the motion vectors needed to the effective coding. At the end of the first step it is possible to carry out the IPD procedure of the invention to implement a fine motion estimation in the second step.

Finally, the IPD method of the invention, when associated to a method for motion estimation, provides for alternative advantages as compared to the use of the motion estimator without any IPD modulus of the invention. A better quality of the predicted pictures for the same maximum number of calculated matchings per macroblock is provided because it is possible to increase the number of Frame only or Field only predictors (up to certain maximum number) by choosing the prediction mode depending on the indication provided by the IPD modulus. A lower number of matchings per macroblock is obtained for the same quality of predicted pictures because either a Field prediction or a Frame prediction is carried out. This depends on the indications provided by the IPD modulus, thus resulting is a savings from 30% to 50% of the number of matchings depending on the motion estimation mode.

That which is claimed is:

1. A method for processing a bitstream of coded data of video sequences of progressive or interlaced pictures, the method comprising:

estimating motion vectors of groups of pixels belonging to a top half-frame of a current picture in relation to pixels belonging to a bottom half-frame of a preceding pictures;

estimating motion vectors of groups of pixels of a bottom half-frame of the current picture in relation to pixels belonging to the top half-frame of the current picture;

calculating for the top half-frame and the bottom half-frame of the current picture a respective top motion coefficient and a bottom motion coefficient based upon the estimation of the motion vectors of the top half-frame and the bottom half-frame;

performing a preliminary test using the calculated values of the top and bottom motion coefficients comprising summing the motion coefficients belonging to the top half-frame of the current picture for producing a top sum coefficient, summing the motion coefficients belonging to the bottom half-frame of the current picture producing a bottom sum coefficient, and defining the current picture as a progressive picture if the top sum coefficient and the bottom sum coefficient are lower than respective pre-established first and second positive numbers, otherwise proceeding with recognizing the current picture as an interlaced picture by the substantial equality of the distributions of values of the motion coefficients or as a progressive picture by the substantial inequality of the distributions of values of the motion coefficients; and recognizing the current picture as the interlaced picture by a substantial equality of a distribution of values of the motion coefficients, or as the progressive picture by a substantial inequality of the distributions of values of the motion coefficients.

2. A method according to claim 1 wherein recognizing comprises:

comparing the top motion coefficients with a top threshold and comparing the bottom motion coefficients with a bottom threshold;

counting the motion vectors having motion coefficients lower than the top threshold with respect to the top half-frames and the bottom half-frames of the current picture for producing a pair of first and second coefficients; and counting the motion vectors whose motion coefficients are greater than the bottom threshold with respect to the top half-frames and the bottom half-frames of the current picture for producing a second pair of third and fourth coefficients;

wherein recognizing the current picture as progressive picture or an interlaced picture is based upon the first, second, third and fourth coefficients relative to the current picture and to the preceding pictures.

3. A method according to claim 2 further comprising:

calculating a first ratio between the first coefficient relative to the current picture and the second coefficient relative to the preceding picture;

calculating a second ratio between the second coefficient relative to the current picture and the first coefficient relative to the current picture;

calculating a third ratio between the third coefficient relative to the current picture and the fourth coefficient relative to the preceding picture;

calculating a fourth ratio between the fourth coefficient relative to a current picture and the third coefficient relative to the current picture; and comparing the first, second, third and fourth ratios with respective pre-established third, fourth, fifth and sixth positive numbers recognizing the current picture as a progressive picture if the first and fourth ratios are lower than the pre-established third and sixth positive numbers, respectively, and if simultaneously the second and third ratios are greater than the pre-established fourth and fifth positive numbers, respectively.

4. A method according to claim 3 further comprising:
dividing the first and second ratios for producing a fifth ratio; and
dividing the third and fourth ratios for producing a sixth ratio;
wherein recognizing the current picture as a progressive picture is based upon results of comparing and if simultaneously the fifth and sixth ratios are greater than pre-established seventh and eighth numbers.

5. A method according to claim 1 wherein recognizing comprises:
calculating a pair of first and second shape coefficients representing distributions of the top and bottom motion coefficients, respectively;
wherein recognizing the current picture a progressive picture or an interlaced picture is based upon whether the shape coefficients differ by a quantity greater or lower than a certain value, respectively.

6. A method according to claim 1 wherein recognizing further comprises:
calculating a coefficient representing a stochastic correlation between distribution of the top and bottom motion coefficients;
wherein recognizing the current picture a progressive picture or an interlaced picture is based upon whether the calculated coefficient exceeds a certain value.

7. A method according to claim 1 further comprising:
calculating a temporary weight value as a function of a result of recognizing the current picture as a progressive or interlaced picture; and
calculating a final weight value as a function of the temporary weight value relative to the current picture and of final weight values relative to preceding pictures;
wherein recognizing the current picture as a progressive or an interlaced picture depends on the temporary weight value relative to the current picture and on the final weight values relative to preceding pictures.

8. A method according to claim 1 further comprising calculating motion vectors of a picture of the video sequences using a Frame-Prediction technique if the current picture is recognized as a progressive picture or using a Field-Prediction technique if the current picture is recognized as an interlaced picture.

9. A method according to claim 1 wherein the video sequences are processed according to an MPEG standard.

10. A method for processing a bitstream of coded data of video sequences of progressive or interlaced pictures, the method comprising:
estimating motion vectors of groups of pixels belonging to a top half-frame of a current picture in relation to pixels belonging to a bottom half-frame of a preceding picture,
estimating motion vectors of groups of pixels of a bottom half-frame of the current picture in relation to pixels belonging to the top half-frame of the current picture;
calculating for the top half-frame and the bottom half-frame of the current picture a respective top motion coefficient and a bottom motion coefficient based on the estimation of the motion vectors of the top half-frame and the bottom half-frame;
performing a preliminary test using the calculated values of the top and bottom motion coefficients comprising
summing the motion coefficients belonging to the top half-frame of the current picture for producing a top sum coefficient,
summing the motion coefficients belonging to the bottom half-frame of the current picture producing a bottom sum coefficient, and
defining the current picture as a progressive picture if the top sum coefficient and the bottom sum coefficient are lower than respective pre-established first and second positive numbers, otherwise proceeding with recognizing the current picture as an interlaced picture by the substantial equality of the distributions of values of the motion coefficients or as a progressive picture by the substantial inequality of the distributions of values of the motion coefficients; and
recognizing the current picture as the interlaced picture or as the progressive picture based upon distributions of values of the motion coefficients.

11. A method according to claim 10 wherein a substantial equality of the distribution of values of the motion coefficients corresponds to an interlaced picture and a substantial inequality of the distributions of values of the motion coefficients corresponds to a progressive picture.

12. A method according to claim 11 further comprising:
calculating a first ratio between the first coefficient relative to the current picture and the second coefficient relative to the preceding picture;
calculating a second ratio between the second coefficient relative to the current picture and the first coefficient relative to the current picture;
calculating a third ratio between the third coefficient relative to the current picture and the fourth coefficient relative to the preceding picture;
calculating a fourth ratio between the fourth coefficient relative to a current picture and the third coefficient relative to the current picture; and
comparing the first, second, third and fourth ratios with respective pre-established third, fourth, fifth and sixth positive numbers recognizing the current picture as a progressive picture if the first and fourth ratios are lower than the pre-established third and sixth positive numbers, respectively, and if simultaneously the second and third ratios are greater than the pre-established fourth and fifth positive numbers, respectively.

13. A method according to claim 12 further comprising:
dividing the first and second ratios for producing a fifth ratio; and
dividing the third and fourth ratios for producing a sixth ratio;
wherein recognizing the current picture as a progressive picture is based upon results of comparing and if simultaneously the fifth and sixth ratios are greater than pre-established seventh and eighth numbers.

14. A method according to claim 10 wherein recognizing comprises:
comparing the top motion coefficients with a top threshold and comparing the bottom motion coefficients with a bottom threshold;
counting the motion vectors having motion coefficients lower than the top threshold with respect to the top half-frames and the bottom half-frames of the current picture for producing a pair of first and second coefficients; and
counting the motion vectors whose motion coefficients are greater than the bottom threshold with respect to the top half-frames and the bottom half-frames of the current picture for producing a second pair of third and fourth coefficients;

wherein recognizing the current picture as progressive picture or an interlaced picture is based upon the first, second, third and fourth coefficients relative to the current picture and to the preceding pictures.

15. A method according to claim 10 wherein recognizing comprises:

calculating a pair of first and second shape coefficients representing distributions of the top and bottom motion coefficients, respectively;

wherein recognizing the current picture a progressive picture or an interlaced picture is based upon whether the shape coefficients differ by a quantity greater or lower than a certain value, respectively.

16. A method according to claim 10 wherein recognizing further comprises:

calculating a coefficient representing a stochastic correlation between distribution of the top and bottom motion coefficients;

wherein recognizing the current picture a progressive picture or an interlaced picture is based upon whether the calculated coefficient exceeds a certain value.

17. A method according to claim 10 further comprising:

calculating a temporary weight value as a function of a result of recognizing the current picture as a progressive or interlaced picture; and calculating a final weight value as a function of the temporary weight value relative to the current picture and of final weight values relative to preceding pictures;

wherein recognizing the current picture as a progressive or an interlaced picture depends on the temporary weight value relative to the current picture and on the final weight values relative to preceding pictures.

18. A method according to claim 10 further comprising calculating motion vectors of a picture of the video sequences using a Frame-Prediction technique if the current picture is recognized as a progressive picture or using a Field-Prediction technique if the current picture is recognized as an interlaced picture.

19. A method according to claim 10 wherein the video sequences are processed according to an MPEG standard.

20. A video processor for processing a bitstream of coded data of video sequences of progressive or interlaced pictures, the video processor comprising:

a first estimator for estimating motion vectors of groups of pixels belonging to a top half-frame of a current picture in relation to pixels belonging to a bottom half-frame of a preceding picture;

a second estimator for estimating motion vectors of group of pixels of a bottom half-frame of the current picture in relation to pixels belonging to the top half-frame of the current picture;

a calculator for calculating for the top half-frame and the bottom half-frame of the current picture a respective top motion coefficient and a bottom motion coefficient depending on the estimation of the motion vectors of the top half-frame and the bottom half-frame, and for performing a preliminary test comprising summing the motion coefficients belonging to the top half-frame of the current picture for producing a top sum coefficient;

summing the motion coefficients belonging to the bottom half-frame of the current picture producing a bottom sum coefficient; and defining the current picture as a progressive picture if the top sum coefficient and the bottom sum coefficient are lower than respective pre-established first and second positive numbers, otherwise proceeding with recognizing the current picture as an interlaced picture by the substantial equality of the distributions of values of the motion coefficients or as a progressive picture by the substantial inequality of the distributions of values of the motion coefficients; and a detector for recognizing the current picture as the interlaced picture or as the progressive picture based upon the distributions of values of the motion coefficients.

21. A video processor according to claim 20 wherein a substantial equality of the distribution of values of the motion coefficients corresponds to an interlaced picture and a substantial inequality of the distributions of values of the motion coefficients corresponds to a progressive picture.

22. A video processor according to claim 20 wherein said detector:

compares the top motion coefficients with a top threshold and comparing the bottom motion coefficients with a bottom threshold;

counts the motion vectors having motion coefficients lower than the top threshold with respect to the top half-frames and the bottom half-frames of the current picture for producing a pair of first and second coefficients; and counts the motion vectors whose motion coefficients are greater than the bottom threshold with respect to the top half-frames and the bottom half-frames of the current picture for producing a second pair of third and fourth coefficients;

wherein said detector recognizes the current picture as a progressive picture or as an interlaced picture based upon the first, second, third and fourth coefficients relative to the current picture and to the preceding pictures.

23. A video processor according to claim 22 wherein said detector:

calculates a first ratio between the first coefficient relative to the current picture and the second coefficient relative to the preceding picture;

calculates a second ratio between the second coefficient relative to the current picture and the first coefficient relative to the current picture;

calculates a third ratio between the third coefficient relative to the current picture and the fourth coefficient relative to the preceding picture;

calculates a fourth ratio between the fourth coefficient relative to a current picture and the third coefficient relative to the current picture; and compares the first, second, third and fourth ratios with respective pre-established third, fourth, fifth and sixth positive numbers recognizing the current picture as a progressive picture if the first and fourth ratios are lower than the pre-established third and sixth positive numbers, respectively, and if simultaneously the second and third ratios are greater than the pre-established fourth and fifth positive numbers, respectively.

24. A video processor according to claim 23 wherein said detector:

divides the second and first ratios for producing a fifth ratio; and divides the third and fourth ratios for producing a sixth ratio;

said detector recognizes the current picture as a progressive picture or as an interlaced picture based upon results of the comparing and if simultaneously the fifth and sixth ratios are greater than pre-established seventh and eighth numbers.

25. A video processor according to claim 20 wherein said detector:

calculates a pair of first and second shape coefficients representing distributions of the top and bottom motion coefficients, respectively;

said detector recognizes the current picture as a progressive picture or as an interlaced picture based upon whether the shape coefficients differ by a quantity greater or lower than a certain value, respectively.

26. A video processor according to claim 20 wherein said detector:

calculates a coefficient representing a stochastic correlation between distribution of the top and bottom motion coefficients;

said detector recognizes the current picture as a progressive picture or as an interlaced picture based upon whether the calculated coefficient exceeds a certain value.

27. A video processor according to claim 20 wherein said detector:

calculates a temporary weight value as a function of a result of recognizing the current picture as a progressive or interlaced picture; and calculates a final weight value as a function of the temporary weight value relative to the current picture and of final weight values relative to preceding pictures;

said detector recognizes the current picture as a progressive picture or as an interlaced picture based upon the temporary weight value relative to the current picture and on the final weight values relative to preceding pictures.

28. A video processor according to claim 20 wherein the bitstream of coded data of video sequences are processed according to an MPEG standard.

* * * * *

UNITED STATES PATENT AND TRADEMARK OFFICE
CERTIFICATE OF CORRECTION

PATENT NO. : 6,904,173 B2
DATED : June 7, 2005
INVENTOR(S) : Bagni et al.

It is certified that error appears in the above-identified patent and that said Letters Patent is hereby corrected as shown below:

Title page,
Item [73], Assignee, delete "(IL)" insert -- (IT) --.
Item [57], ABSTRACT,
Line 7, delete "group" insert -- groups --.
Line 10, insert -- of -- between "half-frame" and "a".

Column 2,
Line 24, insert -- to -- between "relation" and "pixels".

Column 3,
Line 31, delete "example" insert -- examples --.
Line 49, delete "prcedure" insert -- procedure --.

Column 11,
Line 27, insert -- as -- between "picture" and "a".

Column 13,
Line 22, insert -- as -- between "picture" and "a".
Line 52, delete "group" insert -- groups --.

Signed and Sealed this

Twentieth Day of December, 2005

JON W. DUDAS
*Director of the United States Patent and Trademark Office*